United States Patent

Salverda

[15] 3,688,136
[45] Aug. 29, 1972

[54] MAGNETIC MOTORS
[72] Inventor: Robert E. Salverda, 2118 N. Dale, Roseville, Minn. 55113
[22] Filed: July 28, 1970
[21] Appl. No.: 58,882

[52] U.S. Cl. .......................310/24, 310/37, 310/103
[51] Int. Cl. ..............................................H02k 33/02
[58] Field of Search..........310/20, 23, 24, 34, 35, 37, 310/103

[56] References Cited
UNITED STATES PATENTS 3,171,991   3/1965   Baumer .................310/103 X
2,639,544   5/1953   Coffin.....................310/35 X
3,391,289   7/1968   Danilewicz et al.....310/103 X

*Primary Examiner*—D. F. Duggan
*Attorney*—Robert M. Dunning

[57] ABSTRACT

An intermittently powered motor wherein solenoid activated magnets are periodically moved to repel magnets mounted on an output shaft. The solenoids are adjustably timed by cams on the output shaft.

6 Claims, 2 Drawing Figures

INVENTOR
ROBERT E. SALVERDA
BY Robert M. Dunning
ATTORNEY

MAGNETIC MOTORS

BACKGROUND OF THE INVENTION

A need has emerged today for truly pollution free motors. The noxious gases emitted by internal combustion motors are evident to anyone, however, even electric motors pollute to a degree as a result of arcing brushes which create ozone. The acrid smell associated with electric equipment is well known to most people. My invention provides a motor that avoids the above mentioned problems as described hereinafter.

SUMMARY OF THE INVENTION

Briefly, the present invention contemplates a magnetic motor wherein rotational force is produced by the repulsive effect between magnets. Rotor members mounted on an output shaft carry magnets at their ends which are repulsed in a rotational direction by the periodic interjection of pusher magnets orientated in the same direction as the rotor magnets. Cam operated solenoids interject the pusher magnets into close proximity behind the rotor magnets as they rotate past the pusher magnets. Thus, a motor is produced in which rotation is generated by small periodic pushes as contrasted to a continuously running electric motor which may get quite hot and which may produce an unpleasant odor. My invention has been found to be particularly suited to power large slowly turning devices such as signs commonly seen over service stations and shopping centers. It also is well suited to power smaller display signs such as commonly seen within supermarkets and drugstores. The present invention is conducive to use with battery power supplies because of its intermittent operation whereas continuously running electric motors tend to drain batteries quite quickly. Further it is contemplated the arrangement herein could be expanded to use more magnets and stronger magnets so as to be useful in powering various types of small vehicles. It may therefore be seen that it is an object of my invention to provide a new motor which is pollution free and which will operate for extended periods on battery power. Further objects and advantages will become apparent from the following description and drawings.

DESCRIPTION OF THE PREFERRED EMBODIMENT

Figure 1:
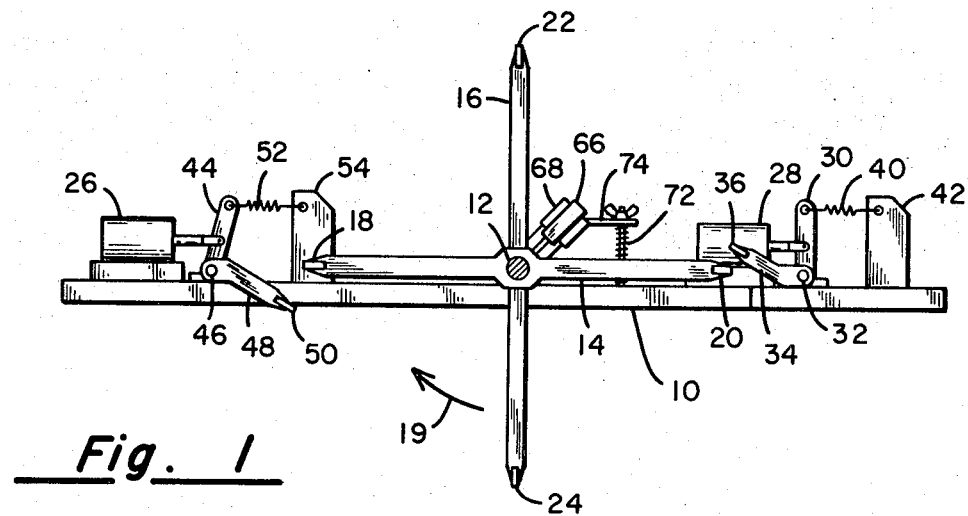
FIG. 1 is a schematic front view of one preferred embodiment of my invention showing the principles of operation of my motor.
Figure 2:
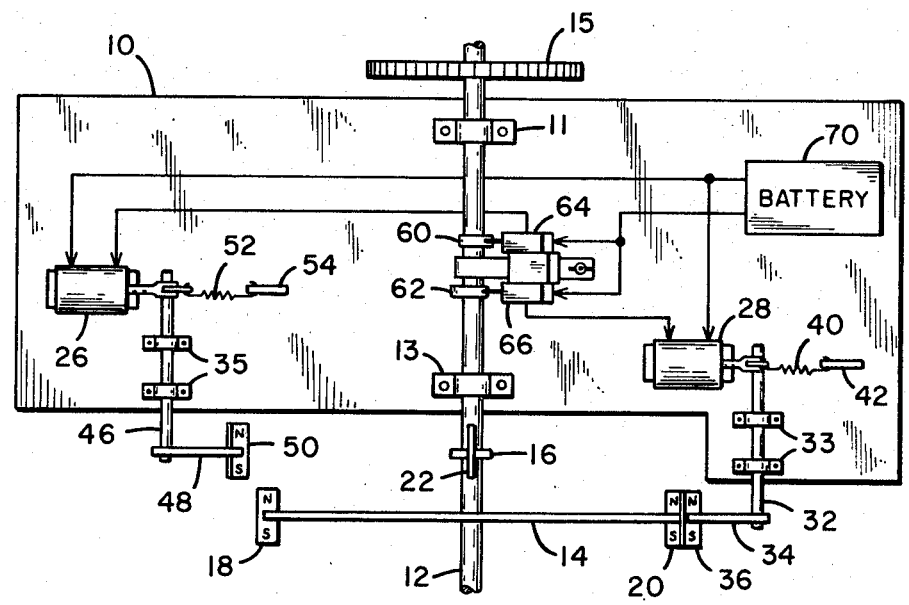
FIG. 2 is a top view of the schematic arrangement of FIG. 1 showing in greater detail the cam timing means and the solenoid linkage and circuitry.

Referring simultaneously to both FIGS. 1 and 2 a suitable base 10 is schematically shown upon which is mounted a rotatable output shaft 12 secured to base 10 by a pair of bearings 11 and 13. A flywheel 15 may be employed to steady the rotation of shaft 12. Two rotor arms or members 14 and 16 extend from shaft 12 and rotate therewith. A pair of magnets 18 and 20 are carried at the opposite ends of members 14 while magnets 22 and 24 are carried at the ends of member 16. The north and south poles of the magnets are all orientated the same way as shown clearly in FIG. 2 by the small S and N letters. Rotary motion is induced in shaft 12 by magnetically pushing on the magnets in members 14 and 16. For instance, member 14 is pushed by a magnet 36 carried in a pivoting member 34 which pivots about a shaft 32. At the proper intervals, a solenoid 28 is activated to pull on an arm 30 which pivots shaft 32 (carried by a pair of bearings 33 on base 10) and arm 34 so that magnet 36 swings in behind magnet 20 on member 14. Since magnets 20 and 36 are aligned the same way, they repel and member 14 continues to rotate as shown by arrow 19 in FIG. 1.

As member 14 rotates through 180°, a spring 40 anchored to base 10 by a bracket 42 pulls deactivated solenoid 28, arm 30, shaft 32, arm 34, and magnet 36 back to a rest position so the other end of member 14 can pass by magnet 36. At this time solenoid 28 is again activated to bring magnet 36 in behind magnet 18 to give another rotational push.

Member 16 is driven in the same way, but 90° out of phase with member 14, by a solenoid 26, arm 44, shaft 46, pivot arm 48 and magnet 50. Return to the rest position is effected by a spring 52 anchored to base 10 by a bracket 54. Shaft 46 is carried on base 10 by a pair of bearings 35.

Proper timing of solenoids 26 and 28 is accomplished through the use of a pair of cams 60 and 62 carried on shaft 12. Cams 60 and 62 are double lobed cams which, twice on each revolution of shaft 12, momentarily close switches 64 and 66. It is clear in FIG. 2 that switch 64 will, upon closing, complete a circuit between a battery 70 and solenoid 26. Switch 66 is connected to momentarily activate solenoid 28. Rough timing is set by the position of the cams on shaft 12. Cams 64 and 66 are of course 90° apart on the shaft. The fine timing is adjustable since switches 64 and 66 are mounted on a pivoting member 68 which pivots about shaft 12. The exact position of member 68 is determined by a set screw 72 which operates between base 10 and a bracket 74 mounted on member 68. For example, if it desired to increase the speed of rotation, magnets 36 and 50 can be interjected sooner by turning set screw 72 to raise member 68 which in effect pivots switches 64 and 66 against the rotation of cams 60 and 62 so that the lobes thereon trigger the solenoids sooner.

It is not intended that the claims be construed as limited to the specific arrangement shown in the drawings which are schematic only since it is obvious that the particular linkage between solenoids 26 and 28 and magnets 36 and 50 is only one of many ways to operate the pusher magnets. Furthermore, the cam arrangement, timing means, and magnet mountings could be varied extensively without departing from the spirit and scope of the invention. Lastly, and most important, the power and speed of the motor is proportional to the number of magnet supporting members on the shaft, the size of the magnets, and the number of pushes utilized. Hence the following claims are presented.

I Claim:

1. A motor of the class described comprising in combination:

rotatable output shaft means;

permanently magnetized means mounted for rotation with said output shaft means;

movable permanent magnet means operable to move periodically into a position proximate to said magnetized means so as to induce rotation about said output shaft means;

solenoid means connected to said movable magnet means adapted to generate said periodic movement; and cam timing means on said output shaft means operable to activate said solenoid means at the proper intervals to achieve optimum rotation of said magnetized means and said output shaft means.

2. The apparatus of claim 1 including cam timing means on said output shaft means operable to activate said solenoid means at the proper intervals to achieve optimum rotation of said magnetized means and said output shaft means.

3. The apparatus of claim 1 in which said cam timing means comprise cams on said output shaft means adapted to periodically activate switches connected to supply power to said solenoid means from a battery.

4. The apparatus of claim 3 in which said magnetized means comprises a plurality of elongated members mounted on the output shaft, each member having a magnet mounted on each end of the member at a predetermined distance from said output shaft.

5. The apparatus of claim 4 in which said movable magnet means comprises magnets mounted on pivoting members operable to periodically pivot toward said magnets on said elongated members in a repelling position so as to push the elongated members about the output shaft.

6. The apparatus of claim 5 in which said cam activated switches are pivotably mounted about said output shaft so as to permit the adjustable timing of said solenoid means.

* * * * *